Oct. 3, 1967 M. R. GREISER 3,344,609
PREVENTION OF BEACH EROSION AND ENCOURAGEMENT
OF LAND RESTORATION
Filed Oct. 23, 1959 2 Sheets-Sheet 1
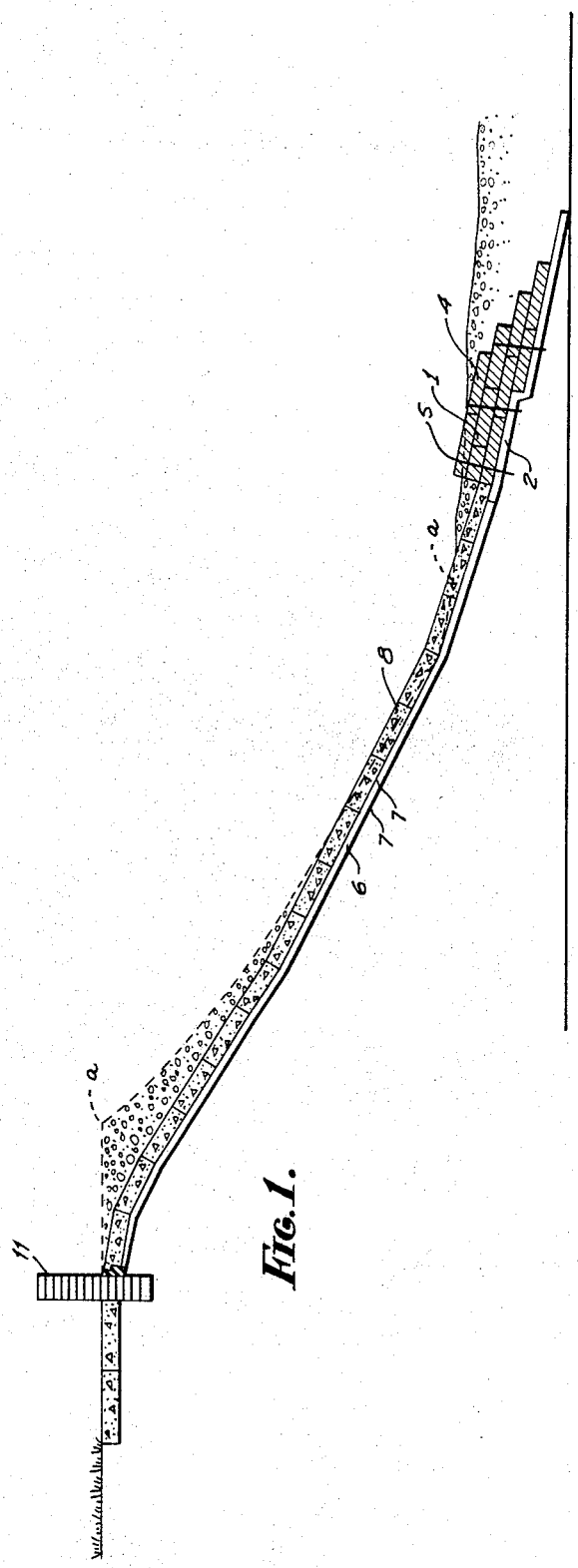
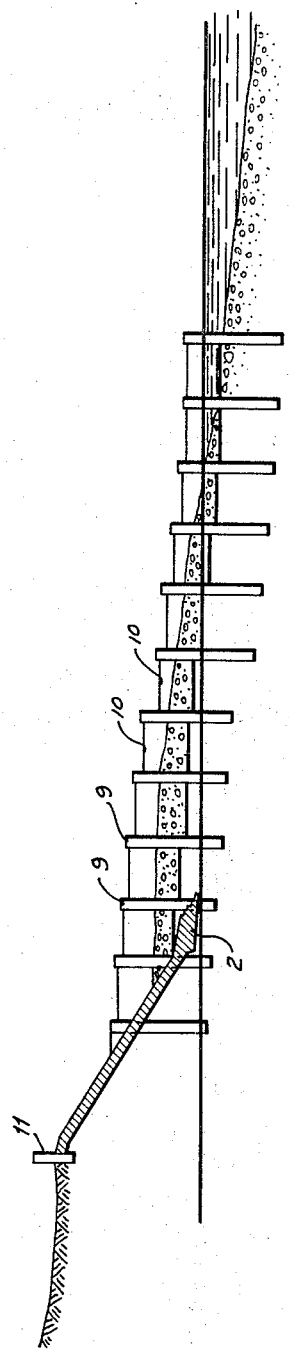
INVENTOR.
MELVIN R. GREISER,
BY
*Allen & Allen*
ATTORNEYS.

Oct. 3, 1967  M. R. GREISER  3,344,609
PREVENTION OF BEACH EROSION AND ENCOURAGEMENT
OF LAND RESTORATION
Filed Oct. 23, 1959  2 Sheets-Sheet 2

INVENTOR.
MELVIN R. GREISER
BY
ATTORNEYS

United States Patent Office 3,344,609
Patented Oct. 3, 1967

3,344,609
PREVENTION OF BEACH EROSION AND ENCOURAGEMENT OF LAND RESTORATION
Melvin R. Greiser, % Carthage Mills, Inc., 124 W. 66th St., Cincinnati, Ohio 45216
Filed Oct. 23, 1959, Ser. No. 848,238
7 Claims. (Cl. 61—38)

ABSTRACT OF THE DISCLOSURE

Method and means for the prevention of erosion of a littoral formation subject to wave action and including a bank sloping toward the water. The bank is covered with anti-erosion means comprising a layer of thin, flexible, foraminous sheet material pervious to water but impervious to the substance of the littoral formation. Means are provided for inhibiting the entrance of water beneath edge portions of the layer.

---

This system uses, for purposes of illustration, the actual background of a project incorporating the principles of our new system of S. Ocean Blvd., New Palm Beach, Fla.

Shore property in South Palm Beach, Fla., was subjected during 1956–1957 to considerable erosion caused by water and wind—not uncommon along the Florida coastline. Heavy seas, 12 to 15 ft. high, carrying away a substantial percent of the sand of the beach caused a shoreline recession of 30 to 40 ft. on this beach front property. The remainder of the beach was lowered 3 to 4 ft.

Erosion continued through the year of 1958 and the situation became more and more acute. By summer only 50 to 60 ft. of beach remained. To use methods of prevention that were available up to that time did not offer the combined advantages of security and elimination of risk of increased erosion and loss of more beach and valuable property outside the limited area to be protected.

Basically, what was done to rebuild this beach might be described as flexible protection.

The purpose of flexible protection is not only to prevent further erosion but to restore an adequate beach. "Restoring" means that material is brought back to the beach. It is self-explanatory that such restoration process, with or without supplementing artificial nourishment of sand fill on the beach must be a careful process taking equal consideration of the place to be protected and of the neighboring property.

Protection and rebuilding was achieved through the use of a high energy absorbing sloping wall or revetment.

In the drawings:

FIGURE 1 is a diagrammatic sectional view illustrating our new system.

FIGURE 2 is a diagrammatic sectional view showing how adjustable groins may be incorporated with our system of preventing beach erosion.

A high energy absorbing sloping wall or revetment in accordance with our system, consists of:

(a) Interlocking precast concrete blocks in the slope.
(b) Ready-mix concrete in burlap bags in a protective apron at the base or underwater level.
(c) Fiberglas anti-erosion filter mats on which precast concrete blocks rest.
(d) An anti-erosion sheet composed of woven fibers of saran, a plastic thread of great strength, under the premixed concrete bags.
(e) Fiberglas securing rods for tying the premixed concrete bags in the apron together.

The main advantage of this type of revetment is that:

(a) It does not offer opportunity for direct impact by waves.
(b) It is shaped in such a way that almost all wave energy attacking the structure is absorbed and its destructive forces thereby eliminated.
(c) It is sand tight so that material is not sucked out through the structure.
(d) Excessive amounts of water are prevented from going through and over the top and water drains out so that excessive pressure does not build up behind the structure.

Figure 3:
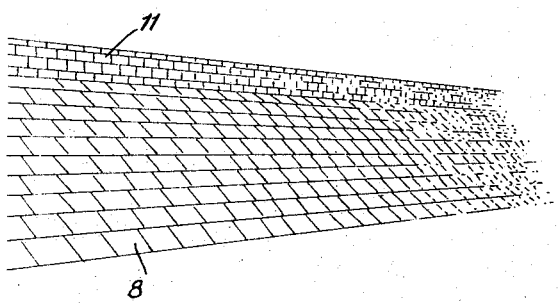
FIGURE 3 is a perspective view of a bank built up with interlocking blocks.
Figure 4:
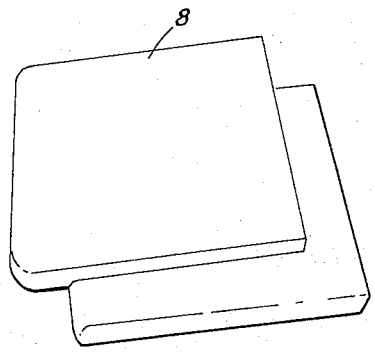
FIGURE 4 is a perspective view of one of the preferred types of interlocking blocks.

The interlocking blocks in the sloping wall (as shown in FIG. 4) may be about 22 by 22 in. square, 5 in. thick and with 4 in. sections offset for interlocking as illustrated at 11a through 11b. Such blocks weigh about 180 pounds each. These blocks fit into the flexible protection principle by permitting movements whereby cracks in the revetment are avoided. The revetment may have a brick wave or splash screen 11 at the top.

The apron in front of the sloping wall, which functions as support for the revetment, and as toe protection against scour consists of 150 lb. ready-mix concrete in burlap bags tied or secured together with 3/8 in. by 20 in. Fiberglas rods. When the sea water covers the bags the concrete becomes set and the set concrete in the bags becomes a permanent durable fill unaffected by waves and water currents.

The sloping wall rests on a Fiberglas anti-erosion filter mat or other anti-erosion sheet composed of woven fiber, and is sand tight but allows water to drain through. The reason why Fiberglas was chosen as the filter-layer was because of its hydraulic properties and its durability.

Fiberglas is now manufactured for coastal engineering purposes in two different special forms, a Fiberglas mat with a neoprene facing and a woven fiberglass cloth:

The Fiberglas anti-erosion filter mat is an improved quality having more tensile strength and it is used particularly for all kinds of revetment purposes above sea level.

Figure 6:
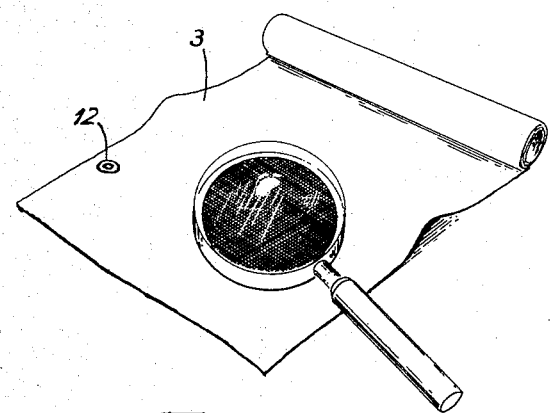
FIGURE 6 is a perspective view of a sheet of woven, water permeable neoprene facing with the structure magnified.

An antierosion sheet similar in appearance to the Fiberglas material shown in FIG. 6 composed of woven fibers of saran, a plastic thread is particularly useful as a protective layer below sea-level. It is permeable by water but not by the sand and gravel carried by the water. The bags of set concrete rest on the anti-erosion sheet.

Adjustable groins may be used, as shown in FIGURE 2. The design allows them to be raised or to be abandoned simply by removing the main part of the groin which is the wooden boards between the King piles driven down into the ground at certain intervals. The advantage of such a groin in regard to measures against erosion on the downdrift side (leeside) of the groin is obvious. As soon as the groin starts doing harm to neighboring property it can be "adjusted" by removing some of the boards so that its adverse effect can be eliminated or reduced.

Prestressed concrete 14 x 16 in. King piles 13 ft. long with grooves on two opposite sides were used in combination with 4 in. x 8 in. x 8 ft. Florida yellow pine boards that were creosoted at 12 pounds pressure. There were 2 to 3 boards below the sand and a varying amount of boards above the sand.

The flexible protection mentioned above on this South Palm Beach property, which was originally considered as an experiment, has fulfilled its purpose, and similar constructions have already been made elsewhere and have proved successful, and model experiments for further developments of flexible revetments of the type mentioned are being developed.

Referring to FIGURE 1, there is shown in dotted lines a—a the original bluff showing how it was being washed away endangering the house on the level at the top of the bank.

At the base of the revetment there is indicated what we have called the apron 1. This is a supporting base below the water line. While Fiberglas anti-erosion filter mats may form the bottom of the apron, we prefer to lay as a base for this apron a series of layers of woven saran. This woven saran 2 is a new product particularly adapted for the construction of revetments and for the base of the apron. Thus sheets of this woven plastic material 3 are laid where, with normal tides, they will, at high tide, be below the water line. Saran wrap is the name of a well-known plastic film made by Dow Chemical Company. The saran material is also capable of being produced as a thread or cord. It is the cord or thread-like material which we have woven specially in a tight, fibrous mat 3 (FIGURE 6) which may be of desired width and have eyelets 12 for receiving Fiberglas securing staples to hold the mat layers in place.

In the apron there are then laid bags of ready mixed concrete 4 which bags are tied together by a series of Fiberglas securing rods 5. The apron thus formed is durable and as the ready mixed concrete hardens with the sea water washing over them forms a very strong and durable base.

Figure 5:
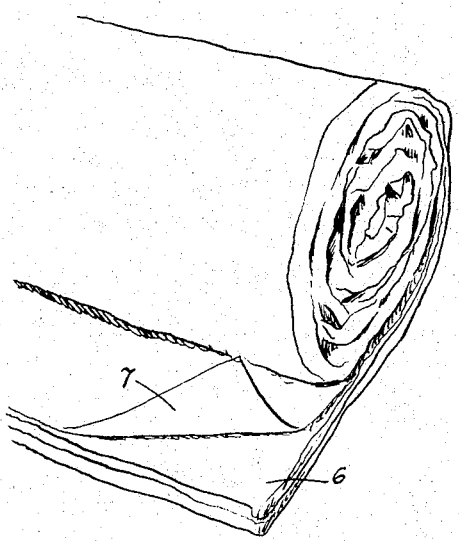
FIGURE 5 is a perspective view of a Fiberglas mat.

Above the base there are laid layers of Fiberglas 6, with a neoprene facing 7 (FIGURE 5). On this Fiberglas bottom for the revetment there are built up a series of rows of interlocking concrete blocks 8 of the type referred to in the companion application of Ronald E. Greiser, Ser. No. 828,820, filed July 22, 1959. These blocks are preferably dimensioned about 22 inches square by about five inches thick and they weigh in the neighborhood of 180 pounds each.

The blocks have overlapping edges on all four sides so that, when laid in regular courses they permit water to seep down around their edges, at the same time the overlocking edges interlock the whole built up flooring in a flexible platform which is subject to some movement with the lashing of high seas but remains in position as a unit.

The seeping water passes through the underlying Fiberglas mat and as water washes in over the blocks the sand is deposited on the top surface of the blocks and gradually a new sand beach is built up. Water receding meets the water ascending and the resultant boil causes sand and gravel to be dropped. The sloping wall or revetment permits the use of breathing material (Fiberglas mats or other anti-erosion woven filter sheets) and also provides a surface where wave energy can be dispersed—thereby eliminating the shock.

Where it is necessary to build up a beach where artificial nourishment is required, we have found that the flexible porous woven saran cloth will be adequate to underlie what artificial nourishment is required. This term artificial nourishment merely means that sand and gravel in loads are needed to smooth out a deep ravine in a beach whether it is parallel with the shore line or oblique to it.

In FIGURE 2 I have shown what we have referred to as adjustable groins. In this figure I have indicated prestressed concrete 14 x 16 in. King piles 9, in standard H piling form. 4 x 8 by 8 ft. Florida yellow pine boards 10 creosoted under about 12 lbs. pressure are secured to the King piles and permit as many of the yellow pine boards to be used as seem desirable. Since the boards are demountable usually the groins have two or three boards below the surface of the beach. Boards can be added or removed as the level of the sand rises or falls. Thus with the adjustable groins, undercutting on one side of the revetment with the consequent damage to a neighbor's beach can be avoided. Anything like a permanent groin is to be avoided because it always seems to result in starving some of the same property or that of a neighbor.

While the adjustable groins and the top splash wall are illustrated in the drawings, neither of these refinements of revetment construction will always be necessary. My invention is primarily in the so-called flexible protection by which a wasted beach may be built up to be a standard and continuously enjoyable part of beach property.

It is essential as part of our system that the mesh of the neoprene or other filter mat such as may be provided by either knitted or welded neoprene or a woven saran thread mat be flexible and adapted to permit water from the waves to drain down through the material without at the same time carrying the finely divided granular matter (usually sand), with the water. The sand or gravel normally is deposited on the upper surface of the interlocked slabs. I have found that the openings in the filter material should as a general rule be smaller than the majority of the sand grains. Thus it appears that a 24 x 24 weave has too large openings to act as a filter for the sand of the Florida beaches. The grain size of Florida beach sand is finer than that of most of the other ocean exposed land in the United States. Most beaches have sand of a grain size of .2 mm. to .3 mm. The weave of the flexible sheet must therefore normally be finer than 24 x 24 perhaps as fine as 30 x 30. Of course, the thread size as in connection with woven saran thread mat has to be compensated for in a calculation of the size of the mesh and its sand filtering capacity.

Having thus described my new system of flexible protection in revetment construction, what I claim as new and desire to secure by Letters Patent is:

1. A method of beach erosion control which comprises configuring a beach so as to comprise a bank sloping toward the water, and subject to wave action, covering said bank with an anti-erosion means comprising a layer of thin, flexible, foraminous sheet material, said layer being pervious to water but substantially impervious to the substance of said beach, providing said layer with means at its edges for inhibiting the entrance of water therebeneath, covering said layer with means for holding it in place gravitationally, said means comprising panel-like concrete blocks having interengaging edge portions, the interengagement of said edge portions being relatively flexible and such as to permit water to seep therethrough.

2. The process claimed in claim 1 including the step of locating upon the edge portion of said layer, which is located toward the water, a structure resistant to wave action and comprising closely spaced bags of hardened concrete.

3. The process claimed in claim 2 including the step of constructing adjustable groins extending from said bank toward the water.

4. In combination with a littoral formation subject to wave action, which formation includes a bank sloping toward the water, anti-erosion means comprising a layer of thin, flexible, foraminous sheet material covering a substantial area of the bank, said layer being pervious to water but substantially impervious to the substance of said littoral formation, and means for inhibiting the entrance of water beneath the edge portions of said layer, means on said layer for holding it in place by gravity, said last mentioned means comprising concrete, panel-like blocks having interengaging edge portions, the interengagement of said edge portions being relatively flexible and such as to permit water to seep therethrough.

5. In combination with a littoral formation subject to wave action, which formation includes a bank sloping toward the water, anti-erosion means comprising a layer of thin, flexible, foraminous sheet material covering a substantial area of said bank, said layer being pervious to water but substantially impervious to the substance of said littoral formation, means for inhibiting the entrance of water beneath edge portions of said layer, said layer having a toe portion extending toward the water, said toe portion being covered and held in place by weighty material resistant to wave action, means on said layer to hold it in place gravitationally, said means comprising panel-like concrete blocks with interengaging edge portions, said interengagement of said edge portions being relatively flexible and such as to permit water to seep therethrough.

6. The structure claimed in claim 5 including a sea wall at the upper edge of said layer.

7. The structure claimed in claim 5 including adjustable groins in spaced relationship extending from said bank toward the water.

References Cited

UNITED STATES PATENTS

| | | | |
|---|---|---|---|
| 1,137,049 | 4/1915 | Callahan | 61—4 |
| 1,275,860 | 8/1918 | Cunningham | 61—38 |
| 1,332,655 | 3/1920 | Willard | 61—37 |
| 1,352,429 | 9/1920 | Clarke | 61—37 |
| 1,802,714 | 4/1931 | Henry | 61—38 X |
| 1,892,701 | 1/1933 | Hoffman | 61—38 |
| 1,948,639 | 2/1934 | Youngberg | 61—4 |
| 2,435,568 | 2/1948 | Anderson | 61—37 |

FOREIGN PATENTS

| | | |
|---|---|---|
| 554,507 | 2/1957 | Belgium. |
| 4,658 | 1/1876 | Great Britain. |
| 787,197 | 12/1957 | Great Britain. |
| 789,644 | 6/1958 | Great Britain. |
| 820,516 | 9/1959 | Great Britain. |
| 68,617 | 4/1915 | Switzerland. |

OTHER REFERENCES

Engineering News-Record of May 11, 1939, p. 67.

DAVID WILLIAMOWSKY, *Primary Examiner.*

W. J. MUSHAKE, J. H. NACHOFF, *Examiners.*

J. SHAPIRO, *Assistant Examiner.*